United States Patent [19]

Kubo et al.

[11] Patent Number: 4,503,286

[45] Date of Patent: Mar. 5, 1985

[54] INPUT DEVICE

[75] Inventors: Yoshizo Kubo; Ikuo Utagawa, both of Miyagi, Japan

[73] Assignee: Alps Electric Co., Ltd., Tokyo, Japan

[21] Appl. No.: 510,331

[22] Filed: Jul. 1, 1983

[30] Foreign Application Priority Data

Jul. 3, 1982 [JP] Japan ........................... 57-100117[U]

[51] Int. Cl.$^3$ ............................................. G08C 21/00
[52] U.S. Cl. ....................................................... 178/18
[58] Field of Search ............... 178/18, 19, 20; 338/99, 338/114

[56] References Cited

U.S. PATENT DOCUMENTS 3,624,619 11/1971 Ambrosio ............................... 178/18

Primary Examiner—Stafford D. Schreyer
Attorney, Agent, or Firm—Guy W. Shoup; Gerard F. Dunne

[57] ABSTRACT

A new and efficient input device of an electrode contact type which has a high mechanical strength and durability and can assure accurate detection of coordinates. The input device comprises an elastic flexible insulator spacer having a conductive element embedded therein which may be a gauze of thin wires of a good conductive material knit into the form of a grid. Upon depression of an outermost insulator protective sheet, a portion of the spacer is deformed to expose the conductive element below and above therefrom thereby to short-circuit the element to first and second resistor layers under and on the spacer, respectively.

3 Claims, 4 Drawing Figures

INPUT DEVICE

BACKGROUND OF THE INVENTION

This invention relates to an input device for use with a display device such as a cathode ray tube (CRT) as a computer terminal, and more particularly to a touch type input device wherein a position of a surface of a panel at which it is pressed by a touch pen or the like is detected.

Various systems have been proposed so far for this type of input devices, for example, an electrode contact type in which membrane switches are contained, a photo matrix type wherein a light source and a photo-sensor are used in combination such that a coordinate of an obstacle on a light path may be detected thereby, a pressure type wherein pressure by touch is detected, and a surface elastic wave type wherein a coordinate is detected by a propagation time of a surface wave along a panel surface. Among these types of systems, the electrode contact type is simpler in construction and is reduced in cost comparing with the remaining types. However, a coordinate input device of the conventional electrode contact type includes therein keyboard switches of a membrane type which employs a transparent plastic film which has evaporated or sputtered thereto a membrane of a metal material such as Ag, Pd and so on, or a membrane of a metal oxide such as $In_2O_3$ and so on over a predetermined area. Accordingly, an input device of this type is disadvantageous in that it has a relatively high contact resistance and a rather low mechanical strength so that the available percentage becomes low and the life becomes short. Further, some membrane electrodes have fine powder of a conductive metal material dispersed in a synthetic resin material. But, dispersion of such metal powder is not always uniform, and hence, accurate detection of coordinates is sometimes obstacled and satisfactory strength cannot be attained.

SUMMARY OF THE INVENTION

Accordingly, it is an object of the present invention to provide an input device which is simple in construction, can be produced at a low cost, has a high mechanical strength and durability, and can assure accurate detection of coordinates.

According to the present invention, there is provided an input device, comprising: an insulator sheet; a first resistor layer formed uniformly on said insulator sheet; a plurality of terminal leads formed at opposite ends of said first resistor layer; an elastic, flexible insulator spacer mounted on said first resistor layer and having a conductive element embedded therein; a second resistor layer formed on said insulator spacer; a plurality of second terminal leads connected to those opposite ends of said second insulator layer which extend perpendicularly to said opposite ends of said first resistor layer; and an insulator protective sheet mounted to cover an upper surface of said second resistor layer; a position in coordinates in two intersecting axial directions being detected from potentials associated with the position of contact of said conductive element with said first and second resistor layers.

Other objects, features and advantages of the present invention will become apparent to those skilled in the art from a reading of the following detailed description of a preferred embodiment, taken in conjunction with the accompanying drawings.

DETAILED DESCRIPTION OF THE INVENTION

Figure 1:
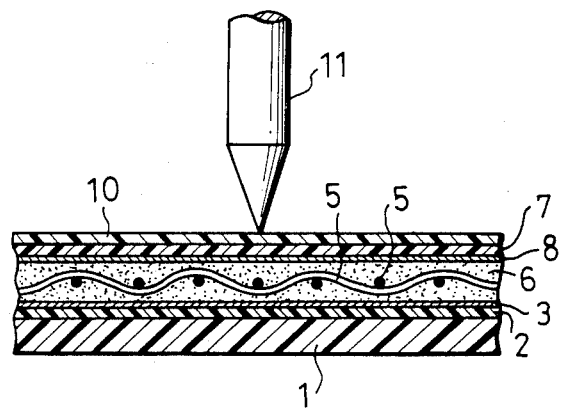
FIG. 1 is a cross sectional view of part of an embodiment of an input device of the present invention.

Referring to FIG. 1, there is shown a cross sectional view of an embodiment of an input device of the present invention.

Figure 2:
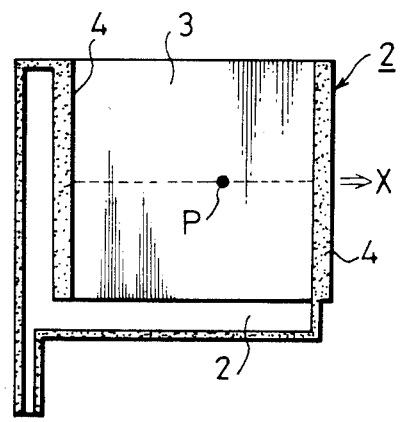
FIG. 2 is a plan view showing a first insulator sheet, a first resistor layer, and second terminal leads of the input device of FIG. 1.

The embodiment is constructed as an input device for a two coordinate display device of the type wherein coordinates in the directions along the X and Y axes are detected. The input device includes an insulator sheet 2 substantially of a regular square configuration which is placed on a substrate 1. To an upper surface of the insulator sheet 2 is applied a resistor layer 3 which is made by suitably mixing carbon and any other conductive material or materials. At opposite ends of the resistor layer 3 in the direction of the X axis are formed a plurality of terminal leads 4 as shown in a plan view of the resistor layer of FIG. 2. The terminal leads 4 are electrodes which are formed on the resistor layer 3 with a conductive film of Ag or any other metal material, and a predetermined voltage is applied across opposite ends of the film.

The first resistor 3 has placed thereon an insulator spacer 6 in which a conductive member 5 knit into the form of a grid is buried or embedded. The conductive member 5 is constituted from a gauze, knit into the form of a grid, either of thin or fine wires of copper or bronze material plated with gold or of thin wires of a good conductive metal material which are coated with a carbon paint of a low resistance. Preferably, the diameter of wires is between 0.05 to 0.2 mm and the wires extend in parallel relationship to each other. The insulator spacer 6 is made of an elastic and flexible material containing foams therein, such as a foamed silicon material. In a normal position not depressed, the insulator spacer 6 retains the conductive member 5 in a plane therewithin to isolate the conductive member 5 from upper and lower surfaces thereof, but when depressed, it will be readily deformed to expose the conductive member 5 from the upper and lower surfaces thereof. Opposite ends of the conductive member 5 (i.e., opposite ends of individual thin wires of the gauze) extend externally from opposite end faces of the insulation spacer 6 and are electrically connected to one end of a circut including the resistor layer 3.

Figure 3:
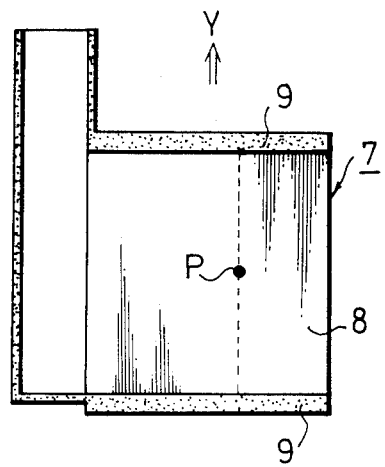
FIG. 3 is a similar plan view but showing a second insulator sheet, a second resistor layer, and second terminal leads of the input device.

A second insulator sheet 7 is mounted in overlapping relationship on the insulator spacer 6 and has a second resistor layer 8 similar to the first resistor layer 3 formed on a lower surface thereof as seen in FIG. 3. The second resistor layer 8 is similar both in its configuration and material to the first resistor layer 3 and have terminal leads 9 provided at opposite ends thereof. These terminal leads 9, however, extend in the direction along the Y axis, that is, in a direction perpendicular to that of the first terminal leads 4, and a predetermined voltage which is independent of the voltage applied across the first resistor layer 3 is applied to the second resistor layer 8. The conductive member 5 has one end thereof electrically connected to a circuit which includes the second resistor layer 8.

An upper surface of the second insulator sheet 7 is covered with a flexible insulator protective sheet 10 made of a polyurethane material.

In the input apparatus of such a construction as described above, a predetermined voltage or voltages are applied between the opposing terminal leads 4 in the direction along the X axis and between the opposing terminal leads 9 in the direction along the Y axis as described above. The application of the voltage is such that a predetermined voltage is applied in a scanning manner to the terminal leads 4, 9 so as to provide time lags between detection signals in the directions along the X and Y axes.

Figure 4:
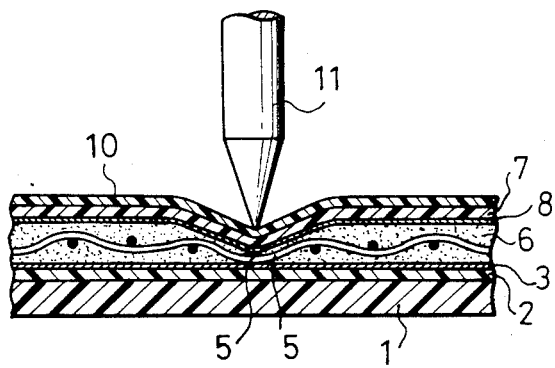
FIG. 4 is a cross sectional view of the input device in its operated condition.

In this condition, if the insulator protective sheet 10 is pressed at a point P of an upper surface thereof by a pressing member 11 which has a pointed end as seen in FIG. 4, the conductive member 5 is pressed down thereby via the second insulator sheet 7 and the insulator spacer 6 so that portions of the insulator spacer 8 above and below the conductive member 5 will be rather expanded therearound and will become very thin to cause the conductive member 5 to be substantially short-circuited to the resistor layers 3 and 8 below and above the same, respectively. In this way, potentials at the depressed point P in the directions along the X and Y axes are detected relative to the voltage or voltages which are scanned to the first and second resistor layers 3, 8 to discriminate the depressed point P in the two axial coordinates in the X and Y axes.

It is to be noted that this embodiment employs a gauze knit into the form of a grid for the conductive member 5. This enables the conductive member to have a prescribed strength even in an input device of a minimized thickness, and even where the elasticity of the insulator spacer is low, the conductive member 7 can be deformed satisfactorily in a condition retained within the insulator spacer.

However, it is to be understood that the conductive member 5 is not limited to a guaze but any suitable material such as a thin film, a member including a number of belt-formed elements, and so on, can be employed for the conductive member 7 only if it meets the requirements of mechanical strength, weight, conductivity and so on.

It is also to be noted that, while the second insulator sheet 7 and the insulator protective sheet 10 in the embodiment are formed into separate bodies, they can be made integral with each other by melting and hardening the surface of the insulator spacer 7.

It is understood that various modifications and improvements may be made in the input device described without departing from the scope of the invention.

What is claimed is:

1. An input device, comprising: an insulator sheet; a first resistor layer formed uniformly on said insulator sheet; a plurality of terminal leads formed at opposite ends of said first resistor layer; an elastic, flexible insulator spacer mounted on said first resistor layer and having a conductive element embedded therein; a second resistor layer formed on said insulator spacer; a plurality of second terminal leads connected to those opposite ends of said second insulator layer which extend perpendicularly to said opposite ends of said first resistor layer, and an insulator protective sheet mounted to cover an upper surface of said second resistor layer; a position in coordinates in two intersecting axial direction being detected from potentials associated with the position of contact of said conductive element with said first and said second resistor layers.

2. An input device according to claim 1, wherein said conductive element embedded in said insulator spacer is a gauze of thin wires of a good conductive metal material which are knit into the form of a grid.

3. An input device according to claim 1, wherein said insulator spacer is made of a foamed silicon material.

* * * * *